United States Patent [19]

Spinner

[11] Patent Number: 4,533,310
[45] Date of Patent: Aug. 6, 1985

[54] ICE MAKING APPARATUS

[75] Inventor: Joseph R. Spinner, Albert Lea, Minn.

[73] Assignee: King-Seeley Thermos Co., Prospect Heights, Ill.

[21] Appl. No.: 402,552

[22] Filed: Jul. 28, 1982

Related U.S. Application Data

[60] Division of Ser. No. 187,133, Sep. 15, 1980, Pat. No. 4,433,559, which is a continuation of Ser. No. 867,892, Jan. 9, 1978, abandoned.

[51] Int. Cl.³ .............................................. B05B 3/00
[52] U.S. Cl. ...................... 425/376 R; 62/320; 62/354; 264/28; 425/208; 425/376 B; 425/378 R
[58] Field of Search .......... 425/376 R, 376 B, 378 R; 264/28; 62/320, 354

[56] References Cited

U.S. PATENT DOCUMENTS

| | | | |
|---|---|---|---|
| 2,402,931 | 6/1946 | Thomas | 62/354 |
| 3,211,209 | 10/1965 | Latinen et al. | 425/378 B |
| 3,620,040 | 10/1969 | Clearman et al. | 62/354 |
| 3,654,770 | 4/1972 | Clearman | 62/320 |
| 3,662,564 | 5/1972 | Clearman et al. | 62/320 |
| 3,683,796 | 8/1972 | Miner et al. | 100/145 |
| 3,702,543 | 11/1972 | Lyman | 425/378 B |
| 3,762,537 | 10/1973 | Lutz | 198/213 |
| 3,769,809 | 11/1973 | Robinson et al. | 62/354 |
| 3,779,033 | 12/1973 | Swanson | 425/376 R |
| 3,797,271 | 3/1974 | Swanson | 62/354 |
| 4,025,274 | 5/1977 | Uemura et al. | 425/376 B |
| 4,198,831 | 4/1980 | Barnard et al. | 62/320 |
| 4,433,559 | 2/1984 | Spinner | 62/354 |

Primary Examiner—Jeffery Thurlow
Assistant Examiner—Patrick Dailey
Attorney, Agent, or Firm—Harness, Dickey & Pierce

[57] ABSTRACT

An ice making apparatus including a machine for producing and harvesting a flake ice product and transferring said product to an ice extruding chamber in which the product is compressed into a hard column of ice that can be broken into ice chunks or "cubes" of predetermined length and be transported to a remotely located ice storage bin, dispenser or the like.

9 Claims, 9 Drawing Figures

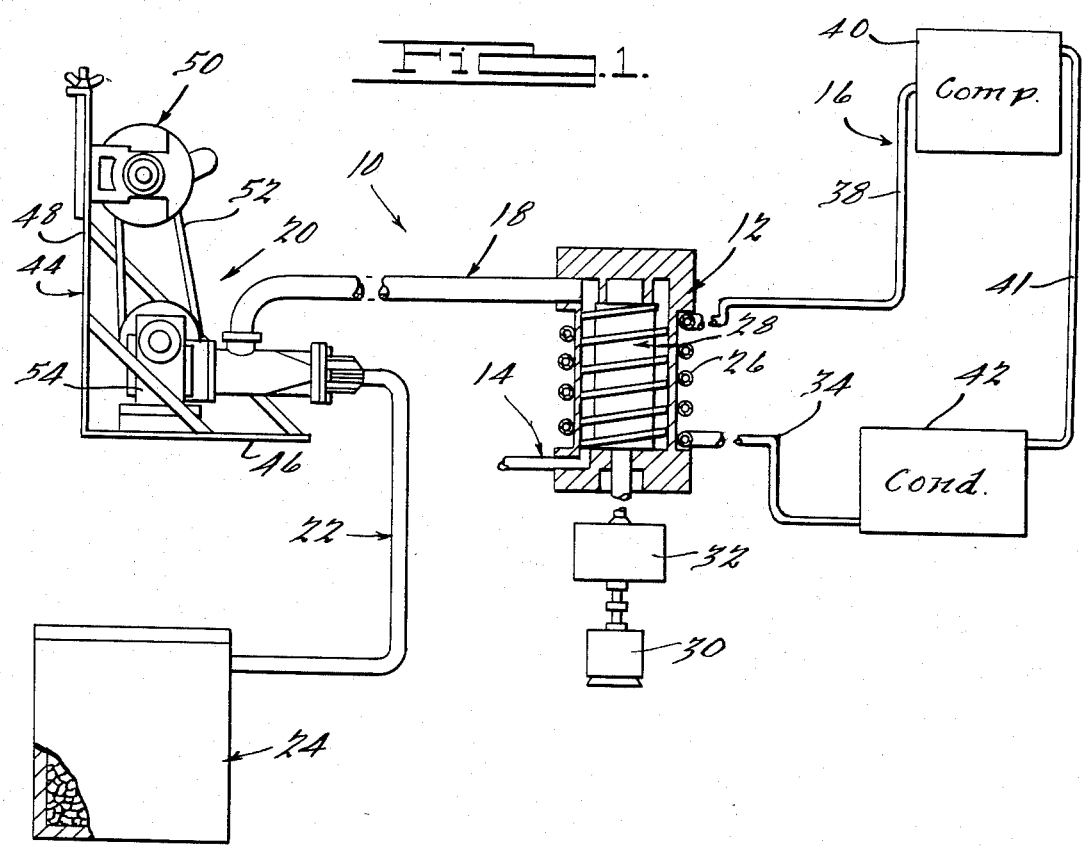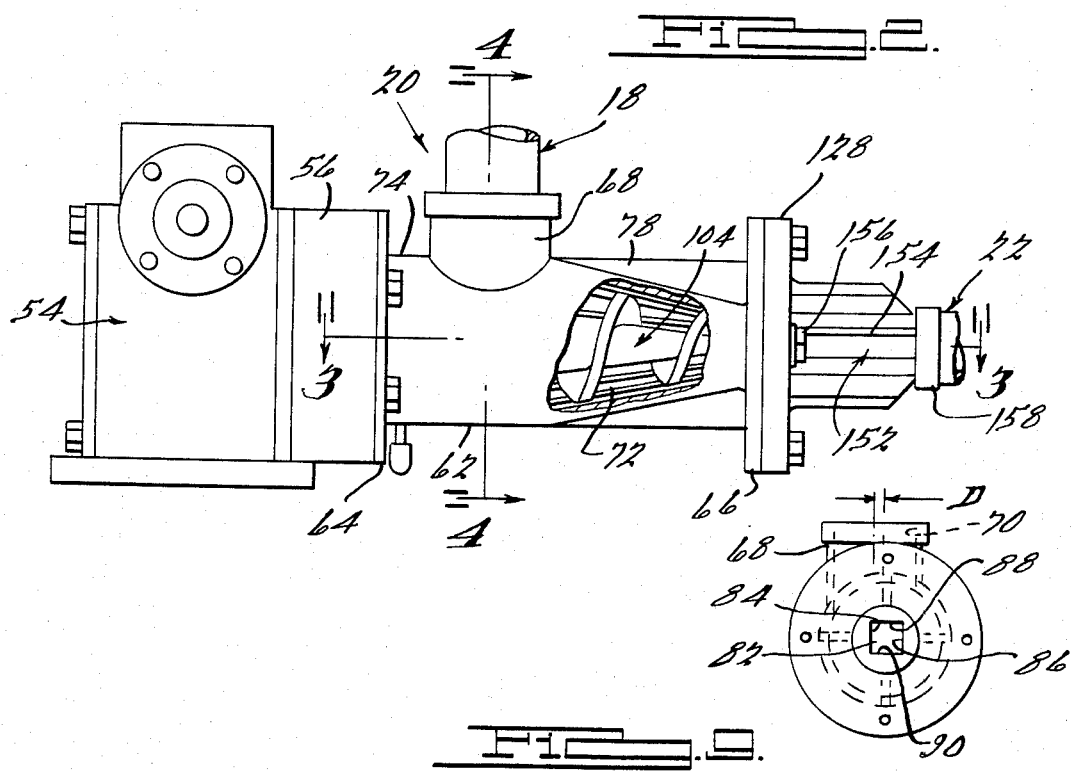

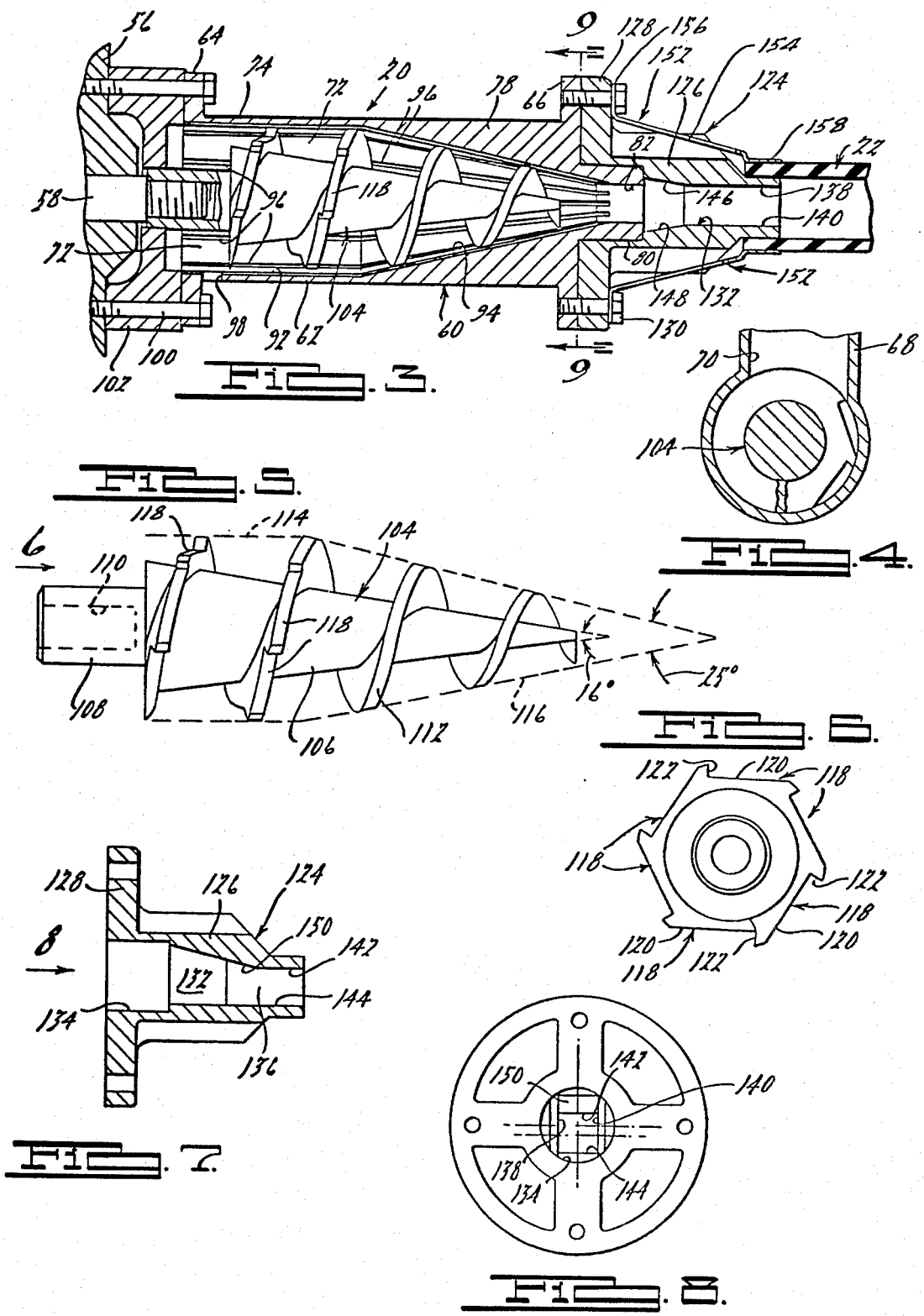

ICE MAKING APPARATUS

This is a division of application Ser. No. 187,133, filed Sept. 15, 1980, now U.S. Pat. No. 4,433,559, as a continuation of application Ser No. 867,892, filed Jan. 9, 1978, now abandoned.

BACKGROUND OF THE INVENTION

The present invention relates generally to the form of commercial ice making machines which produce and harvest a flake ice product formed, for example, around the interior of a refrigerated cylindrical wall that is sized to cooperate with a rotatable harvesting auger which is operative to transfer the flake ice product to an associated ice extruding chamber. Disposed within the chamber is a longitudinally extending rotatable compression auger that is operable to compress the flake ice product into a hard column of ice which moves axially outwardly from the chamber into engagement with a breaker head that causes the column of ice to be broken into discrete ice chunks or "cubes". Generally speaking, the aforesaid type of ice producing apparatus is shown in U.S. Pat. Nos. 3,662,564; 3,702,543 and 3,654,770.

SUMMARY OF THE INVENTION

The present invention is related generally to an ice making apparatus of the type wherein a flake ice product is produced by scrapping the inner walls of a cylindrical freezing compartment with the peripheral edge of a helical harvesting auger. The mass of ice particles thus produced is transferred out of the freezing compartment and through suitable conduit means into an ice extruding or compression chamber having an ice extruding auger disposed therewithin. The auger is cantilever supported within the extruding chamber and is rotated by an associated drive motor. The compression auger is provided with a helical flight or auger blade which is defined in part by an imaginary cylindrical surface and in part by an imaginary frusto-conical surface. In accordance with the present invention, the auger blade is formed with a plurality of circumferentially and axially spaced teeth or notches which facilitate drawing or pulling the flaked ice into the interior of the exterior chamber. Additionally, the flaked ice inlet is laterally offset from the longitudinal or rotational axis of the auger which facilitates the flow of the flaked ice into the chamber. The interior of the chamber is formed with a plurality of longitudinally or axially extending, circumferentially spaced grooves or recesses which act to guide the ice being compacted within the extruder chamber as it moves toward the extruding aperture. Disposed outwardly of this aperture is a deflecting surface that is molded directly onto the breaker head which causes the rod or cylinder of extruded ice to be broken into discrete ice chunks or "cubes" of selected length and uniform cross-sectional shape. These ice cubes may be transferred by means of a suitable conduit to a remotely located ice storage bin or dispenser which provides for consumer access to and utilization thereof.

It is accordingly a general object of the present invention to provide a new and improved apparatus for producing ice in cube or similar form.

It is a more particular object of the present invention to provide a new and improved apparatus of the above type which compresses or compacts a flaked ice product compression chamber to produce high quality ice in cube or chunk form.

It is a related object of the present invention to provide a new and improved ice producing apparatus of the above described type which utilizes a significantly lower or lesser amount of electrical energy as compared to comparable types of ice cube making equipment.

It is another object of the present invention to provide a new and improved extruder-type ice producing device which includes an extruder chamber having an ice compressing auger disposed therewithin, said auger being of a design which facilitates the production of ice at a somewhat lesser pressure than is necessary in analogous prior art ice extruding devices. It is a related object of the present invention to provide an ice extruding apparatus wherein the auger is cantilever mounted within the ice compacting chamber and is provided with a plurality of teeth or notches around the helical auger blade thereof which facilitate the ingress of the flaked ice product into the compacting chamber.

It is yet a related object of the present invention to provide an ice extruding apparatus, as above described, wherein the extruder body is provided with a flaked ice inlet which is laterally offset from the longitudinal or rotational axis of the extruder auger, and which is formed with a plurality of longitudinally extending grooves which guide the ice being compacted within the extruder chamber as said ice moves toward the extruding aperture at the outlet end of the chamber.

It is yet another object of the present invention to provide an ice extruding apparatus, as above described, which includes a deflector surface that is molded directly within the breaker head for causing the column or rod of compacted ice to be broken into discrete ice chunks or cubes preparatory to the transport of such cubes to an associated ice storage bin or the like.

It is still a further object of the present invention to provide an ice producing device of the above character which is of a relatively simple design, will be economical to manufacture and will have a long and effective operational life.

Other objects and advantages of the present invention will become apparent from the following detailed description, taken in conjunction with the accompanying drawings.

BRIEF DESCRIPTION OF THE DRAWINGS

FIG. 1 is a schematic representation of the ice making machine of the present invention, with portions of the flaked ice producing mechanism and ice storage bin being broken away for illustrative purposes;

FIG. 2 is an enlarged side elevational view, partially broken away, of the ice extruding mechanism embodied in the system shown in FIG. 1;

FIG. 3 is an enlarged longitudinal cross-sectional view taken substantially along the line 3—3 of FIG. 2;

FIG. 4 is an enlarged transverse cross-sectional view taken substantially along the line 4—4 of FIG. 2;

FIG. 5 is a side elevational view of the ice compacting or compressing auger embodied in the ice extruding mechanism of the present invention;

FIG. 6 is an end elevational view of the auger shown in FIG. 5, as seen in the direction of the arrow 6 thereof;

FIG. 7 is a transverse cross-sectional view of the breaker head incorporated in the extruder mechanism of the present invention;

FIG. 8 is an end view of the breaker head shown in FIG. 7, as viewed in the direction of the arrow 8 thereof; and FIG. 9 is a cross-sectional view taken substantially along the line 9—9 of FIG. 3.

DESCRIPTION OF A PREFERRED EMBODIMENT

Referring now in detail to the drawings and in particular to FIG. 1 thereof, an ice making apparatus 10, in accordance with one preferred embodiment of the present invention, is shown generally as comprising a flaked ice making machine 12 to which water to be frozen is supplied via a suitable water inlet line or conduit 14. The machine 12 is operatively associated with a refrigeration system 16 by which the aforesaid water is frozen transmitted via a suitable flaked ice transport line or conduit 18 to an ice extruder mechanism which is constructed in accordance with the principles of the present invention and which causes the flaked ice to be compacted or compressed and formed into discrete ice bodies or "cubes" that are communicated via a conduit 22 to a suitable ice storage bin, reservoir, or dispensing chamber, etc., generally designated by the numeral 24, as will hereinafter be described in detail.

By way of example, the flaked ice making apparatus 12 includes a cylindrical freezer housing 26 within which a rotatable auger 28 is disposed, the auger being selectively rotated by means of a drive motor 30 which is connected via a gear mechanism 32 to the auger 28. Refrigerant is supplied via a refrigerant line 34 to an annular evaporator chamber 36 which partially surrounds the freezer housing 26 and causes water supplied through the conduit 14 to freeze around the inner periphery of the housing 26. Refrigerant is returned to the system 16 via a suitable refrigerant line 38 which is connected to a conventional refrigerator compressor 40 that is in turn connected via refrigerant line 41 with an associated refrigeration condenser 42. As is well known in the art, actuation of the auger 28 will cause ice to be sheared off the interior wall of the housing 26 in flaked form and be transmitted upwardly into the conduit 18, from where such flaked ice will travel to the ice extruder mechanism 20 hereinafter to be described.

As illustrated in FIG. 1, the extruder mechanism 20 includes, by way of example, a support structure 44 including a base section 46 and an upright section 48, the latter of which operatively (and preferably adjustably) supports a suitable drive motor 50 operatively connected via a drive belt 52 with a reduction gear assembly 54 mounted upon the base section 46. The assembly 54 includes a suitable housing 56 within which reduction gearing (not shown) is operatively disposed for effecting rotation of an output shaft 58 in response to driving movement of the belt 52.

The ice extruder mechanism 20, as illustrated in FIG. 3, comprises an elongated extruder housing 60 that is arranged generally coaxially of the rotational axis of the shaft 58 and includes a central body section 62 having outwardly projecting flange sections 64 and 66 formed integrally of the opposite ends thereof. The housing 60 also includes an integral ice inlet section 68 projecting upwardly from the central body section 62 thereof, the inlet section 68 defining an inlet bore or passage 70 which is communicable with the conduit 18 when the latter is operatively secured in any suitable manner to the inlet section 68, whereby flaked ice will be transferred from the conduit 18 via the bore 70 to the interior of an elongated extruding chamber 72 defined within the housing 60. In accordance with one feature of the present invention, the axis of the bore or passage 70 is laterally offset a distance D (see FIG. 9) from the longitudinal axis of the ice extruding chamber 72, for purposes to be hereinafter described.

As best seen in FIG. 3, the housing 60 includes a cylindrical or uniform diameter section 74 at the end thereof adjacent the assembly 54, and also includes a frusto-conical or tapered section 78 at the end thereof adjacent the flange section 66. The housing 60 also includes an outlet section 80 which is disposed on the opposite side of the flange 66 from the section 78 and which defines an ice extruding outlet opening 82 that is preferably square in cross section and includes spaced parallel sides 84,86 and spaced parallel upper and lower surfaces 88 and 90. The outlet opening 82 is communicable with the interior of the extruding chamber 72 which consists of a cylindrical portion 92 and a frusto-conical portion 94 that are respectively located within the sections 74 and 78 of the housing 60. A plurality of longitudinally extending, circumferentially spaced and radially outwardly projecting grooves 96 are formed within the inner periphery of the chamber 72 which function as guide means for guiding the flaked ice as it is being compacted and compressed as it moves toward the through the outlet opening 82. Disposed within the lower side of the housing 60 is a suitable outlet port 98 which may be communicable via a suitable conduit or the like with the system drain, or elsewhere, by which water which is compressed out of the flaked ice product during the extruding process may be disposed of. The housing 60 is adapted to be fixedly secured by means of a plurality of suitable fastening elements, i.e. screws, bolts, or the like 100, which extend through suitable openings in the flange 64 and through aligned openings in a mounting pad 102 and are suitably secured to the forward face of the housing 56, whereby the housing 60 is fixedly mounted upon and projects outwardly from the housing 56 in the manner best shown in FIG. 2. In a preferred construction of the present invention, the housing 60 is fabricated by an investment casting process which has been found to be preferably insofar as providing a relatively economical, high quality structure. It will be appreciated, however, that various alternative fabricating techniques may be used without departing from the scope of the present invention. The auger 104 comprises a generally frusto-conical or tapered body having major and minor diameter end portions and is arranged coaxially within the chamber 72.

As best illustrated in FIGS. 2-5, disposed interiorly of the chamber 72 and rotatable therewithin is an ice extruding auger, generally designated by the numeral 104 that is constructed in accordance with the principles of the present invention. Integrally formed with the body 106 is a generally cylindrically-shaped shaft or support section 108 that is formed with an internally threaded blind bore 110 adapted to be threadably connected to the outer end of the output shaft 58 so as to be rotatable concomitantly therewith. As will be seen in FIG. 3, the shaft 58 cooperates with the shaft section 108 in cantilever supporting the auger 104 within the chamber 72. The auger body 106 is also formed with a helical flight or auger blade, generally designated by the numeral 112, which extends helically along the entire length of the conical portion of the body 104. As illustrated in FIG. 5, the profile shape of the auger blade 112 is defined in part by an imaginary cylindrical surface 114 whose axis is colinear with the rotational axis of the auger 104, and also by an imaginary frust-conical surface 116 whose axis is also coaxial with the axis of the auger 104. As will be appreciated by comparing the structures shown in FIGS. 3 and 4, the imaginary surfaces 114 and 116 correspond generally to the interior shape of the sections 74 and 76, respectively, of the housing 60. In a preferred construction, the taper of the imaginary frusto-conical surface 116 is greater than the root taper of the auger body 106, i.e. greater than the taper of the conical surface of the body 106. One preferred construction is indicated in FIG. 5 wherein the taper of the surface 116 is approximately 25°, whereas the root taper of the auger bogy 106 is approximately 16°.

In accordance with one of the features of the present invention, the outer peripheral edge of the portion of the auger blade 112 defined by the imaginary cylindrical surface 114 is formed with a plurality of notches, generally designated by the numeral 118. Each of the notches is defined by major and minor surfaces 120 and 122, respectively, that are arranged by approximately 90° from one another and in a preferred embodiment of the present invention, the blade 112 is formed with eight of such notches which are equally circumferentially and axially spaced along the blade 112 approximately 60° from one another. The notches 118 are intended to function in efficiently drawing flaked ice inwardly through the inlet bore 70 whereupon said ice will be compacted and compressed into a high quality ice.

Disposed on the outlet end of the housing 60, i.e. the right end of the housing 60 as viewed in FIGS. 2 and 3, is a breaker head, generally designated by the numeral 124. The breaker head 124 includes a body 126 which is formed with a generally radially outwardly extending flange section 128 adapted to be secured by means of suitable screws, bolts or the like 130 to be flange section 66 of the housing 60. The interior of the breaker head body 126 is formed with a longitudinally extending outlet passage, generally designated 132, the inlet end of which 134 is enlarged somewhat and adapted to nestingly receive the outwardly projecting section 80 of the housing 60, as best seen in FIGS. 3 and 7. The outlet end of the passage 132 provides an outlet opening 136 which is defined by vertically extending, spaced parallel side walls 138, 140 and by horizontally extending spaced upper and lower walls 142 and 144. As best seen in FIG. 3 the inner ends of the side walls 138 and 140 are tapered, as seen at 146 and 148, respectively, while the upper wall 142 is formed with an inclined surface defining a breaker ramp 150 that functions in a manner to be hereinafter described in causing the solid rod or column of ice, which is produced as the flaked ice is forced through the outlet opening 82, to break off into discrete ice chunks or "cubes" of predetermined length, as will be described in connection wit the overall operation of the present invention.

As previously mentioned, the ice chunks or cubes produced by the ice extruder mechanism 20 are communicated via a suitable conduit 22 to some remote location, such as the aforementioned storage bin or dispensing device, representatively designated by the numeral 24. The inlet end of conduit 22 is adapted to be fixedly secured to the outlet end of the breaker head 124 by means of a pair of securing brackets illustrated in FIG. 3 and generally designated by the numeral 152. Each of the brackets 152 includes a support arm 154 having an end section 156 at one end thereof that is secured by means of the aforementioned screws, bolts or the like 130 to the breaker head 124. The opposite or outer ends of the brackets 152 include arcuate-shaped clamping sections 158 adapted to clampingly secure the end of the conduit 22 to the outlet end of the breaker head 124 in a manner such that inadvertent separation or disassembly of the conduit 22 from the breaker head 124 is prevented, even under the pressure conditions which are produced during an ice extruding operation.

In operation of the system 10, assuming that the housing 26 of the ice making apparatus 12 is being supplied with a suitable source of water via the conduit 14, and that the refrigeration system 16 is operable to cause the freezing of such water around the inner periphery of the freezer housing 26, energization of the drive motor 30 will effect rotation of the auger 28 so as to cause a flaked ice product to be transferred from the upper end of the housing 26 into the conduit 18. This flaked ice product will be communicated via the conduit 18 into the bore 70 of the extruding housing 60, from where the ice product will enter the interior of the extruding chamber 72. Assuming that the drive motor 50 is energized to effect driving movement of the belt 52 and rotation of the drive shaft 58, the extruder auger 104 will be caused to rotate within the chamber 72. Such rotation of the auger 104 will cause the flaked ice product to be compressed or compacted as it is moved longitudinally along the interior of the chamber 72 and forced axially outwardly through the outlet opening 82. By virtue of the square cross-sectional shape of the opening 82, the ice passing outwardly therethrough will be in the form of a solid ice rod or column of corresponding square cross-sectional shape. As this rod or column of ice progresses outwardly through the opening 82, it will engage the breaker ramp 150 within the breaker head 124, resulting in the column of ice fracturing into substantially uniform length discrete ice chunks or cubes, and as a result of the uniform, predetermined cross section of this ice, it is possible to communicate the same through the conduit 22 to some remote location, such as the ice storage bin of the dispensing device 24, without such ice becoming jammed within the conduit 22. In a preferred construction of the present invention, the shape and cross-sectional area of the conduit 22 is selected so that the diameter thereof is only slightly larger than the diagonal distance across the generally square cross-sectional area of the ice cubes, which results in facilitating the transport of the ice through the conduit 22 solely under the force of additional ice being extruded through the opening 82. The conduit 22 may be made of any suitable flexible tubing, such as a suitable rubber or plastic having the requisite sanitary characteristics, and it will be noted that the cross-sectional configuration of the conduit 22 is not critical provided the dimensions thereof conform closely to those of the ice being transported therethrough. It is to be appreciated that one of the important advantages and features of the present invention resides in the fact that the so-called ice cubes produced thereby are of substantially the same form at both the entrance end and the exit end of the conduit 22, which is accomplished due to the fact that the flaked ice product is compacted and "pre-shaped" into discrete particles having uniform, transverse cross-sectional dimensions before it is introduced into the conduit so that it will not disintegrate under the influence of the compressive force applied during its passage from the extruder mechanism 20 to the storage bin or the like 24.

Another important feature of the present invention resides in the fact that an extremely high quality ice cube is produced, the term "high quality" meaning that the ice is substantially free of trapped bubbles, impurities and minerals, as well as excess water, all of which are forced out of the ice as it is being compacted and compressed while moving toward and through the outlet opening 82. As previously mentioned, such excess water, as well as any minerals or impurities therein, will be removed from the chamber 72 via the outlet port 98.

Another important feature of the present invention resides in the fact that the laterally offset inlet opening 82 and the plurality of nothces 118 cooperate to facilitate the ingress of the flaked ice product into the interior of the extruding chamber 72, as compared to prior art ice extruding devices. This feature, together with the provision of the plurality of circumferentially spaced longitudinally extending grooves and the smooth blending shape of the extruding chamber 72 as the periphery thereof terminates at the outlet opening 82, results in the production of the aforementioned high quality ice product at a somewhat reduced pressure as compared to prior art designs. A related feature of the present invention resides in the fact that a comparable volume of a cube-like ice product can be produced by means of the present invention with a significantly less amount of energy, as compared to conventional ice cube making equipment. Accordingly, the present invention not only provides a means by which an extremely high quality ice cube product can be made, but one in which the ice product can be produced with significant savings in the operational cost of the ice making apparatus.

While it will be apparent that the preferred embodiment of the invention disclosed is well calculated to fulfill the objects above stated, it will be appreciated that the invention is susceptible to modification, variation and change without departing from the proper scope of fair meaning of the subjoined claims.

I claim:

1. Apparatus for producing relatively solid ice bodies from crushed or flake ice comprising,
   an extruder body having an axially extending generally horizontally disposed circular chamber therein having a wall section of progressively decreasing diameter,
   a generally vertically disposed downwardly extending ice inlet the center line of which is laterally displaced from the axis of said chamber opening into the side of said chamber adjacent the larger end of said section through which said ice can enter said chamber in part at least under the influence of gravity,
   an ice extruding auger rotatably mounted in said body and having a helical ice advancing flight thereon of substatially the same progressively decreasing diameter as the corresponding chamber section and forming with said wall section an annular space,
   said auger acting to advance said ice from said inlet through said annular space and thereby compress and dewater the same and produce said relatively solid ice bodies,
   means axially aligned with and disposed at the larger end of said chamber for rotating said auger,
   and an axially extending outlet for said relatively solid ice bodies axially aligned with said chamber and positioned adjacent the smaller end of said auger body.

2. Apparatus as defined in claim 1, wherein the inner surface of said chamber is formed with a plurality of axially extending circumferentially spaced grooves for guiding movement of ice as it moves from said inlet toward said outlet.

3. The apparatus of claim 1 in which the auger is rotatably mounted by cantilever mounting means located only at the end thereof remote from the smaller end of the auger.

4. The apparatus of claim 1 wherein the root diameter of the auger progressively decreases between the inlet and the outlet.

5. Apparatus for producing relatively solid ice bodies from crushed or flake ice comprising,
   an extruder body having an axially extending circular chamber therein having a wall section of progressively decreasing diameter,
   an ice inlet laterally offset from the axis of said extending body chamber into the side of said chamber adjacent the larger end of said section,
   an outlet for said relatively solid ice bodies positioned at the smaller end of said chamber,
   an ice extruding auger rotatably mounted in said body and having a helical ice advancing flight thereon having a portion of substantially the same progressively decreasing diameter and length as the corresponding chamber section, said auger having a root diameter which progressively decreases between the inlet and the outlet and forms with said wall section an annular space,
   said auger acting to advance said ice from said inlet through said annular space and thereby compress and dewater the same and produce said relatively solid ice bodies.

6. Apparatus for producing relatively solid ice bodies from crushed or flake ice comprising,
   an extruder body havng an axially extending circular chamber therein having a wall section of progressively decreasing diameter,
   an ice inlet laterally offset from the axis of said extending body chamber opening into the side of said chamber adjacent the larger end of said section,
   an axially extending outlet positioned at and axially aligned with the smaller end of chamber and providing an unobstructed outlet for said relatively solid ice bodies,
   an ice extruding auger rotatably mounted within said chamber and extending substantially to said outlet,
   said auger having a helical ice advancing flight thereon of substantially the same progressively decreasing diameter as the corresponding chamber section and forming with said wall section an annular space,
   at least a portion of the auger flight having notches formed in the periphery thereof, each of said notches having a minor section which abruptly decreases in radius and defines an ice advancing abutment and a major section the radius of which gradually increases and merges into said periphery.

7. Apparatus for producing relatively solid ice bodies from crushed or flake ice comprising:
   an extruder body having an axially extending circular chamber therein having a wall section of progressively decreasing diameter,
   an ice inlet opening into the side of said chamber adjacent the larger end of said section, said ice inlet being laterally offset from the axis of said extruder body,
   an outlet for said relatively solid ice bodies positioned at the smaller end of said chamber, an ice extruding auger rotatably mounted in said body and having a helical ice advancing flight thereon having a portion of substantially the same progressively decreasing diameter and length as the corresponding chamber section, said auger having a root diameter which progressively decreases said wall section an annular space, said auger acting to advance said ice from said inlet through said annular space and thereby compress and dewater the same and produce said relatively solid ice bodies.

8. Apparatus for producing relatively solid ice bodies from crushed or flake ice comprising:

an extruder body having axially successive cylindrical and progressively tapered wall sections therein, an ice inlet opening into the side of said chamber within the cylindrical wall section thereof, said ice inlet being laterally offset from the axis of said extruder body, an ice outlet for said ice bodies positioned at the smaller end of said tapered chamber, an ice extruding auger rotatably mounted in said body and extending substantially to said outlet and having an helical ice advancing flight thereon having corresponding axially successive cylindrical and tapered sections of wall sections, said auger having a root diameter which continuously decreases throughout at least said tapered chamber wall section and forms with said chamber wall section an annular space, said auger acting to advance said ice from said inlet through said annular space and thereby compress and dewater the same and produce said relatively solid ice bodies.

9. Apparatus for producing relatively solid ice bodies from crushed or flake ice comprising:

an extruder body having an axially extending circular chamber therein having a wall section of progressively decreasing diameter, an ice inlet opening into the side of said chamber adjacent the larger end of said section, said ice inlet being laterally offset from the axis of the chamber of said extruder body, and axially extending outlet positioned at and axially aligned with the smaller end of chamber and providing an unobstructed outlet for said relatively solid ice bodies, an ice extruding auger rotatably mounted within said chamber and extending substantially to said outlet, said auger having a helical ice advancing flight thereon of substantially the same progressively decreasing diameter as the corresponding chamber section and forming with said wall section an annular space, at least a portion of the auger flight having notches formed in the periphery thereof, each of said notches having a minor section which abruptly decrease in radius and defines an ice advancing abutment and a major section the radius of which gradually increases and merges into said periphery.

* * * * *

UNITED STATES PATENT AND TRADEMARK OFFICE
CERTIFICATE OF CORRECTION

PATENT NO. : 4,533,310

DATED : August 6, 1985

INVENTOR(S) : Joseph R. Spinner

It is certified that error appears in the above-identified patent and that said Letters Patent is hereby corrected as shown below:

Column 1, line 29; "scrapping" should be --scraping--

Column 4, line 23; "the" should be --and--

Column 4, line 40; "preferably" should be --preferable--

Column 5, line 11; "bogy" should be --body--

Column 5, line 19; "by" should be --at--

Column 5, line 34; "be" should be --the--

Column 5, line 53; "wit" should be --with--

Column 7, line 10; "nothces" should be --notches--

Column 7, line 52; "substatially" should be --substantially--

Signed and Sealed this

Twenty-fifth Day of March 1986

[SEAL]

Attest:

DONALD J. QUIGG

Attesting Officer — Commissioner of Patents and Trademarks